United States Patent
Fukasawa

(10) Patent No.: US 8,913,293 B2
(45) Date of Patent: Dec. 16, 2014

(54) RELIABLE HIGH-SPEED DUPLEX PRINTING MODE CONFIGURED TO ISSUE SIMPLEX-PRINTING REQUESTS FOR INDIVIDUAL SIDES BASED ON A PLURALITY OF INPUT DUPLEX-PRINTING REQUESTS FOR INDIVIDUAL SHEETS

(71) Applicant: KYOCERA Document Solutions Inc., Osaka (JP)

(72) Inventor: Yuki Fukasawa, Osaka (JP)

(73) Assignee: KYOCERA Document Solutions (JP)

( * ) Notice: Subject to any disclaimer, the term of this patent is extended or adjusted under 35 U.S.C. 154(b) by 35 days.

(21) Appl. No.: 13/920,892

(22) Filed: Jun. 18, 2013

(65) Prior Publication Data
US 2014/0002832 A1 Jan. 2, 2014

(30) Foreign Application Priority Data
Jun. 28, 2012 (JP) ................. 2012-145077

(51) Int. Cl.
| | |
|---|---|
| H04N 1/60 | (2006.01) |
| G06K 15/16 | (2006.01) |
| H04N 1/00 | (2006.01) |
| G03G 15/00 | (2006.01) |
| H04N 1/23 | (2006.01) |
| B41J 3/60 | (2006.01) |

(52) U.S. Cl.
CPC ............ *G06K 15/16* (2013.01); *H04N 1/00278* (2013.01); *G03G 15/00* (2013.01); *H04N 1/2369* (2013.01); *B41J 3/60* (2013.01); *H04N 2201/0094* (2013.01)
USPC .......................................... 358/1.9; 358/498

(58) Field of Classification Search
CPC .................. H04N 1/00822; H04N 1/2369
USPC ............................. 358/1.1–3.29, 498
See application file for complete search history.

(56) References Cited

U.S. PATENT DOCUMENTS

| | | | | |
|---|---|---|---|---|
| 8,687,225 | B2 * | 4/2014 | Tao et al. ..................... | 358/1.16 |
| 2010/0014884 | A1 * | 1/2010 | Roppongi ...................... | 399/82 |
| 2011/0280643 | A1 * | 11/2011 | Matsumoto et al. .......... | 400/582 |

FOREIGN PATENT DOCUMENTS

JP  2002-337417  * 11/2002

* cited by examiner

*Primary Examiner* — Benny Q Tieu
*Assistant Examiner* — Marcellus Augustin
(74) *Attorney, Agent, or Firm* — McDonnell Boehnen Hulbert & Berghoff LLP

(57) ABSTRACT

An image forming apparatus includes a high-speed duplex-printing mode execution unit, a print request unit, an output processing unit, a request control unit, and a request invalidation unit. The high-speed duplex-printing mode execution unit executes a high-speed duplex-printing mode in which image formation is sequentially performed on first sides from a leading sheet, and then image formation is performed on a second side of at least the leading sheet. The print request unit issues simplex-printing requests. The output processing unit receives the requests, performs an output process, and causes image formation to be performed. The request control unit causes the print request unit to issue simplex-printing requests using, as a trigger, either input of each duplex-printing request or completion of the output process. The request invalidation unit maintains a trigger based on the output process completion as invalid.

20 Claims, 6 Drawing Sheets

FOUR-SHEET CIRCULATION, SIX PAGES

THREE-SHEET CIRCULATION, SIX PAGES

RELIABLE HIGH-SPEED DUPLEX PRINTING MODE CONFIGURED TO ISSUE SIMPLEX-PRINTING REQUESTS FOR INDIVIDUAL SIDES BASED ON A PLURALITY OF INPUT DUPLEX-PRINTING REQUESTS FOR INDIVIDUAL SHEETS

INCORPORATION BY REFERENCE

This application is based upon, and claims the benefit of priority from, corresponding Japanese Patent Application No. 2012-145077 filed in the Japan Patent Office on Jun. 28, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to an image forming apparatus capable of executing a high-speed duplex-printing mode, and a non-transitory computer-readable recording medium having an image formation program recorded thereon.

Some image forming apparatuses, such as digital multifunction peripherals, are configured to execute a high-speed duplex-printing mode in which duplex image formation is performed in parallel while a plurality of sheets are being simultaneously circulated. The high-speed duplex-printing mode enables duplex printing on a plurality of sheets with higher speed as compared to duplex printing on each sheet in turn.

To ensure high-speed performance, it is preferable to at least sequentially print on one side (the side printed first, hereinafter referred to as the "first side") of a plurality of sheets, starting from the leading sheet in a circular direction in accordance with the number of sheets capable of being simultaneously circulated.

For example, in an apparatus in which four sheets are capable of being circulated (four-sheet circulation), if six pages are to be printed in duplex mode, the first sides of three consecutive pages P2, P4, and P6 are printed in order, starting from the leading sheet. After that, the second sides P1, P3, and P5 are printed in order starting from the leading sheet.

The high-speed duplex-printing mode is executed in such a manner that duplex-printing requests for individual sheets are issued through a print job process, and a video controller issues, based on the duplex-printing requests, simplex-printing requests for individual sides at appropriate timings. After the simplex-printing requests have been issued, image formation is performed on the sheets through an output process performed by an engine controller.

Typically, simplex-printing requests are issued using, as triggers, (i) a request to the video controller for duplex printing for each sheet and (ii) completion of an output process performed by the engine controller in response to a simplex-printing request. Using both the triggers enables issuance of simplex-printing requests at appropriate timings. However, the timing at which a duplex-printing request for each sheet is issued may be delayed depending on how a print job is processed, and therefore issuance of a simplex-printing request (itself triggered by issuance of the duplex-printing request) is not performed at an appropriate timing in some cases. If the duplex-printing request for the second or subsequent sheet is delayed, duplex printing may be performed in a normal duplex-printing mode or a defective high-speed duplex-printing mode.

For example, if a duplex-printing request for the second sheet is delayed, after an output process for a simplex-printing request for the first side of the first sheet is completed but before the duplex-printing request is input, a simplex-printing request for the second side of the first sheet is issued as a trigger upon completion of the output process for the first side of the first sheet (normal duplex-printing mode). Also, if a duplex-printing request for the third sheet is delayed, after an output process for a simplex-printing request for the first side of the first sheet is completed but before the duplex-printing request is input, a simplex-printing request for the second side of the first sheet is issued as a trigger upon completion of the output process for the first side of the first sheet (defective high-speed duplex-printing mode).

SUMMARY

The present disclosure relates to an image forming apparatus capable of reliably executing a high-speed duplex-printing mode even if a request for duplex printing for a second or subsequent sheet is delayed.

An image forming apparatus according to an aspect of the present disclosure includes a high-speed duplex-printing mode execution unit, a print request unit, an output processing unit, a request control unit, and a request invalidation unit. The high-speed duplex-printing mode execution unit executes, if duplex image formation is to be performed, a high-speed duplex-printing mode in which image formation is sequentially performed on first sides of a plurality of sheets starting from a leading sheet in a circulation direction in accordance with the number of sheets capable of being simultaneously circulated, and then image formation is performed on a second side of at least the leading sheet. The print request unit issues simplex-printing requests for individual sides based on a plurality of input duplex-printing requests for individual sheets. The output processing unit receives the simplex-printing requests for the individual sides, performs the output process, and causes image formation to be performed on corresponding sides. The request control unit causes, in response to issuance of the plurality of duplex-printing requests, the print request unit to sequentially issue simplex-printing requests using, as a trigger, either input of each duplex-printing request or completion of the output process for a simplex-printing request in the output processing unit. The request invalidation unit maintains a trigger based on the completion of the output process as invalid until the number of duplex-printing requests that have been input becomes equal to the number of sheets for which sequential image formation on first sides is allowed.

A non-transitory computer-readable recording medium according to an aspect of the present disclosure is a non-transitory computer-readable recording medium having an image formation program recorded thereon. The program causes a computer to function as an image forming apparatus. The program causes the computer to function as a high-speed duplex printing execution unit, a print request unit, an output processing unit, a request control unit, and a request invalidation unit. If the image forming apparatus is caused to perform duplex image formation, the high-speed duplex printing execution unit sequentially performs image formation on first sides of a plurality of sheets starting from a leading sheet in a circulation direction in accordance with the number of sheets capable of being simultaneously circulated, and then performs image formation on a second side of at least the leading sheet. The print request unit issues simplex-printing requests for individual sides based on a plurality of input duplex-printing requests for individual sheets. The output processing unit receives the simplex-printing requests for the individual sides, performs the output process, and causes image formation to be performed on corresponding sides. The request control unit causes, in response to issuance of the plurality of duplex-printing requests, the print request unit to sequentially issue simplex-printing requests using, as a trigger, either input of each duplex-printing request or completion of the output process for a simplex-printing request in the output processing unit. The request invalidation unit maintains a trigger based on the completion of the output process as invalid until the number of duplex-printing requests that have been input becomes equal to the number of sheets for which sequential image formation on first sides is allowed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
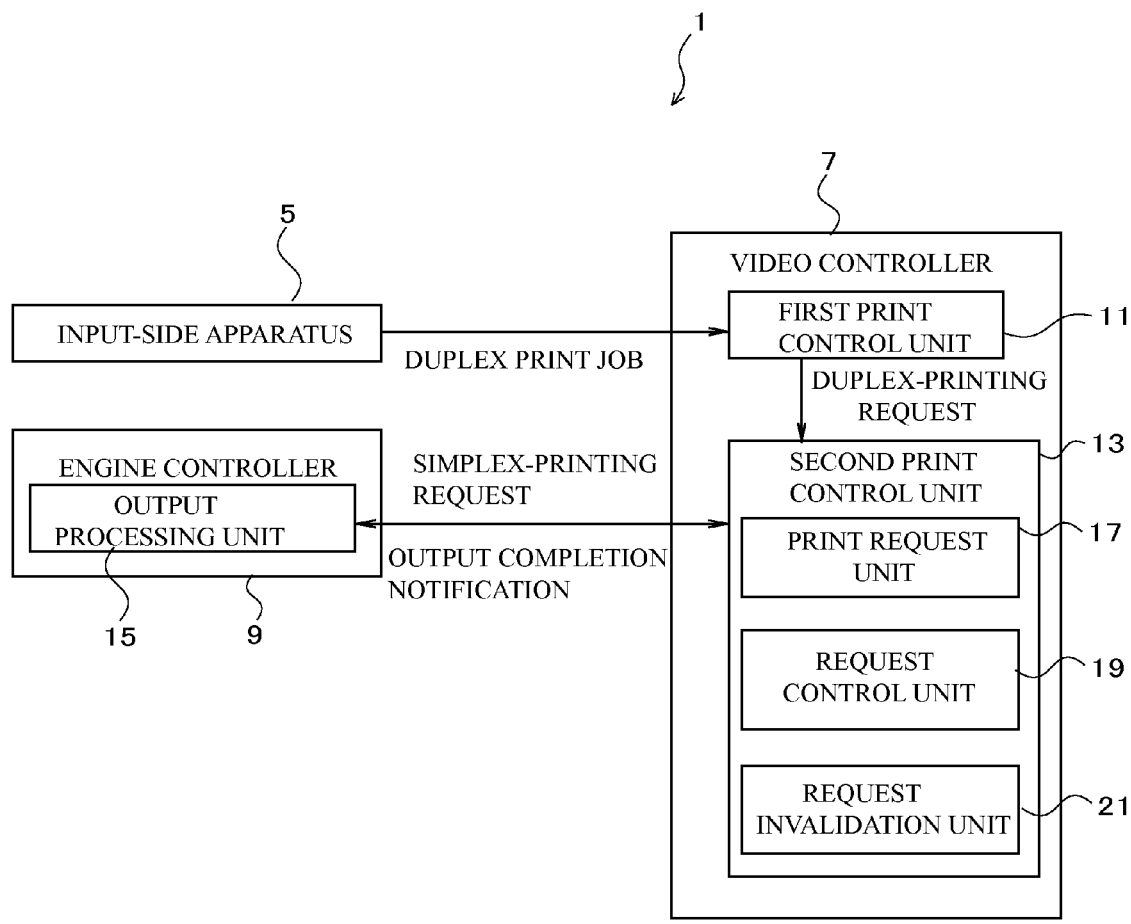
FIG. 1 shows a block diagram illustrating a schematic configuration of an image forming apparatus according to an embodiment of the present disclosure.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 shows a block diagram illustrating a schematic configuration of an image forming apparatus according to an embodiment of the present disclosure.

An image forming apparatus 1 is configured as, for example, a digital multifunction peripheral, and performs a printing operation by receiving print requests (print jobs) in units of jobs from an input-side apparatus 5, which is a component such as a scanner, or a processing terminal such as a host computer. In the printing operation, parallel processes can be performed while a plurality of sheets are being simultaneously circulated. The number of sheets capable of being circulated changes in accordance with the size of sheets or the length of a transport path (not illustrated).

Examples of a printing operation include simplex printing in which image formation is performed on one side of a sheet, and duplex printing in which image formation is performed on both sides of a sheet. The image forming apparatus 1 according to the embodiment is capable of executing duplex printing in a high-speed duplex-printing mode as well as a normal duplex-printing mode.

The normal duplex-printing mode is a mode in which image formation is performed on both sides of each sheet in turn. On the other hand, the high-speed duplex-printing mode is a mode in which image formation is performed on both sides of sheets in parallel while a plurality of sheets are being simultaneously circulated. In the high-speed duplex-printing mode, image formation is sequentially performed on the first sides of a plurality of sheets starting from the leading sheet in a circulation direction in accordance with the number of sheets capable of being simultaneously circulated, and then image formation is performed on the second side of at least the leading sheet.

Figure 2:
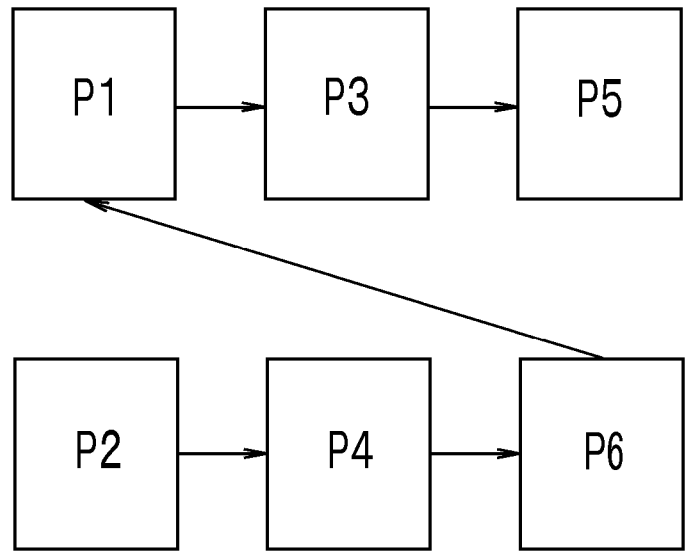
FIG. 2 shows a conceptual diagram illustrating examples of print order in a high-speed duplex-printing mode of the image forming apparatus.
Figure 2:
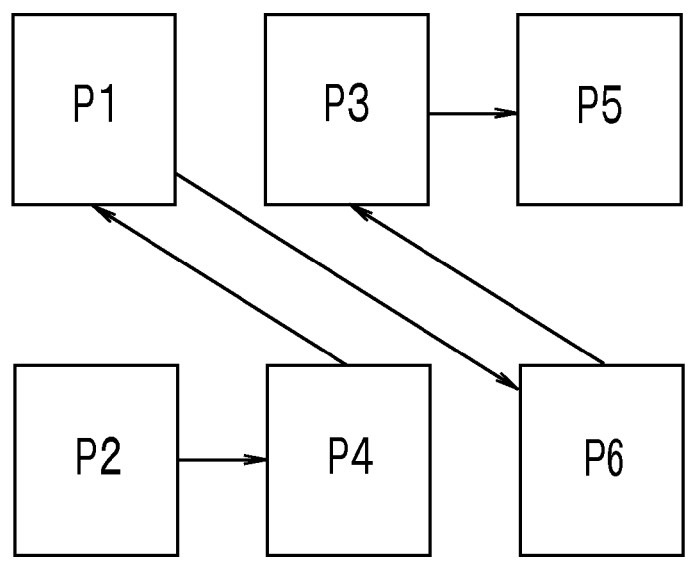

FIG. 2 illustrates examples of a print order in the high-speed duplex-printing mode.

For example, if the image forming apparatus is configured with a four-sheet circulation and duplex printing for six pages is to be performed on three sheets, image formation is performed on the first sides for three consecutive pages in the order of P2, P4, and P6 starting from the leading sheet, and then image formation is performed on the second sides in the order of P1, P3, and P5 starting from the leading sheet.

If the image forming apparatus is configured with a three-sheet circulation and duplex printing for six pages is to be performed on three sheets, image formation is performed on the first sides for consecutive two pages in the order of P2 and P4 starting from the leading sheet, and then image formation for P1 is performed on the second side of the leading sheet. Subsequently, image formation is performed in the order of P6, P3, and P5.

In the image forming apparatus 1 according to the embodiment, image formation on the first sides can be sequentially performed on N−1 sheets, where N is the number of sheets capable of being circulated.

Such a printing operation is controlled using a video controller 7, which is an image processing control unit, and an engine controller 9, which is an output control unit, both of which are illustrated in FIG. 1.

The video controller 7 includes a central processing unit (CPU) serving as a control element, a read only memory (ROM) and a random access memory (RAM) serving as storage devices, and so forth. The video controller 7 issues simplex-printing requests in units of pages, based on a print job received from the input-side apparatus 5.

The engine controller 9 includes a CPU, a ROM, a RAM, and so forth, like the video controller 7. The engine controller 9 controls a transfer unit, a fixing unit, a transport path, and so forth (not illustrated) so that image formation is performed on a sheet, in response to a simplex-printing request from the video controller 7. If a plurality of sheets are to be simultaneously circulated, the engine controller 9 controls the operation of the transport path.

In the embodiment, the video controller 7 and the engine controller 9 execute a high-speed duplex printing program stored in the ROM or the like, and thereby include a first print control unit 11, a second print control unit 13, and an output processing unit 15 as functional elements for the high-speed duplex-printing mode.

The first print control unit 11 is a functional element of the video controller 7, and issues duplex-printing requests for individual sheets based on an input duplex-printing job for a plurality of sheets.

The second print control unit 13 is a functional element of the video controller 7, and includes a print request unit 17, a request control unit 19, and a request invalidation unit 21.

The print request unit 17 implements a print request procedure, and receives duplex-printing requests for individual sheets from the first print control unit 11. The print request unit 17 issues simplex-printing requests for individual sides (first side and second side) of each sheet included in an input duplex-printing request.

The request control unit 19 implements a request control procedure, and causes the print request unit 17 to issue simplex-printing requests for the first side and second side at certain timings. Specifically, in response to receiving a plurality of duplex-printing requests, the request control unit 19 causes the print request unit 17 to sequentially issue simplex-printing requests using, as a trigger, either input of a duplex-printing request or completion of an output process for a simplex-printing request in the output processing unit 15 described below (output-completion notification).

Basically, a simplex-printing request for the first side is issued using a request for duplex printing as a trigger. However, depending on the process capacity of the engine controller 9 (the processing speed of the CPU, the storage capacity of the RAM, etc.), the simplex-printing request for the first side may not immediately issue after a duplex-printing request has been input. In this case, the simplex-printing request for the first side is issued using an output-completion notification from the output processing unit 15 of the engine controller 9 as a trigger. On the other hand, a simplex-printing request for the second side is issued using an output-completion notification as a trigger.

The request invalidation unit 21 implements a request invalidation procedure, and maintains a trigger based on an output-completion notification as invalid until the number of duplex-printing requests that have been input becomes equal to the number of sheets for which sequential image formation on the first sides is allowed in the image forming apparatus 1. In the embodiment, assuming that the number of sheets capable of circulation is represented by N, a trigger based on an output-completion notification is maintained as invalid until the number of duplex-printing requests that have been input becomes N−1.

At the time of invalidating a trigger, the request invalidation unit 21 acquires information about the side for which a simplex-printing request is issued next (next-page information) in response to issuance of an output-completion notification. The next-page information may be held in the RAM of the video controller 7.

The request invalidation unit 21 determines, using the acquired next-page information, whether or not the number of duplex-printing requests that have been issued is N−1. In accordance with the determination, the request invalidation unit 21 causes the request control unit 19 not to issue a simplex-printing request for the other side of a sheet (invalidation of a trigger).

When the output process is performed by the output processing unit 15 on the last of the simplex-printing requests that have been sequentially issued by the print request unit 17, the request invalidation unit 21 does not invalidate the trigger based on the completion notification for the output process.

Thus, the request invalidation unit 21 determines whether or not an output-completion notification corresponds to the last of the issued simplex-printing requests. The determination can be performed by determining, based on the number of issued simplex-printing requests and the number of received output-completion notifications, whether or not the number of simplex-printing requests for which the output-completion notification has not been received is less than one. The number of issued simplex-printing requests and the number of received output-completion notifications may be incremented every time the request or notification is issued or received, and may be held in the RAM of the video controller 7.

The output processing unit 15 is a functional element of the engine controller 9, and implements an output processing procedure. That is, the output processing unit 15 receives simplex-printing requests for individual sides issued by the print request unit 17, performs the output process thereon, and causes image formation to be performed on corresponding sides.

In the output process, the output processing unit 15 loads the image data related to a received simplex-printing request to the RAM or the like of the video controller 7. Then, the output processing unit 15 uses the image data to perform image formation on a sheet. After the image formation has been completed, the output processing unit 15 outputs an output-completion notification to the video controller 7.

Figure 3:
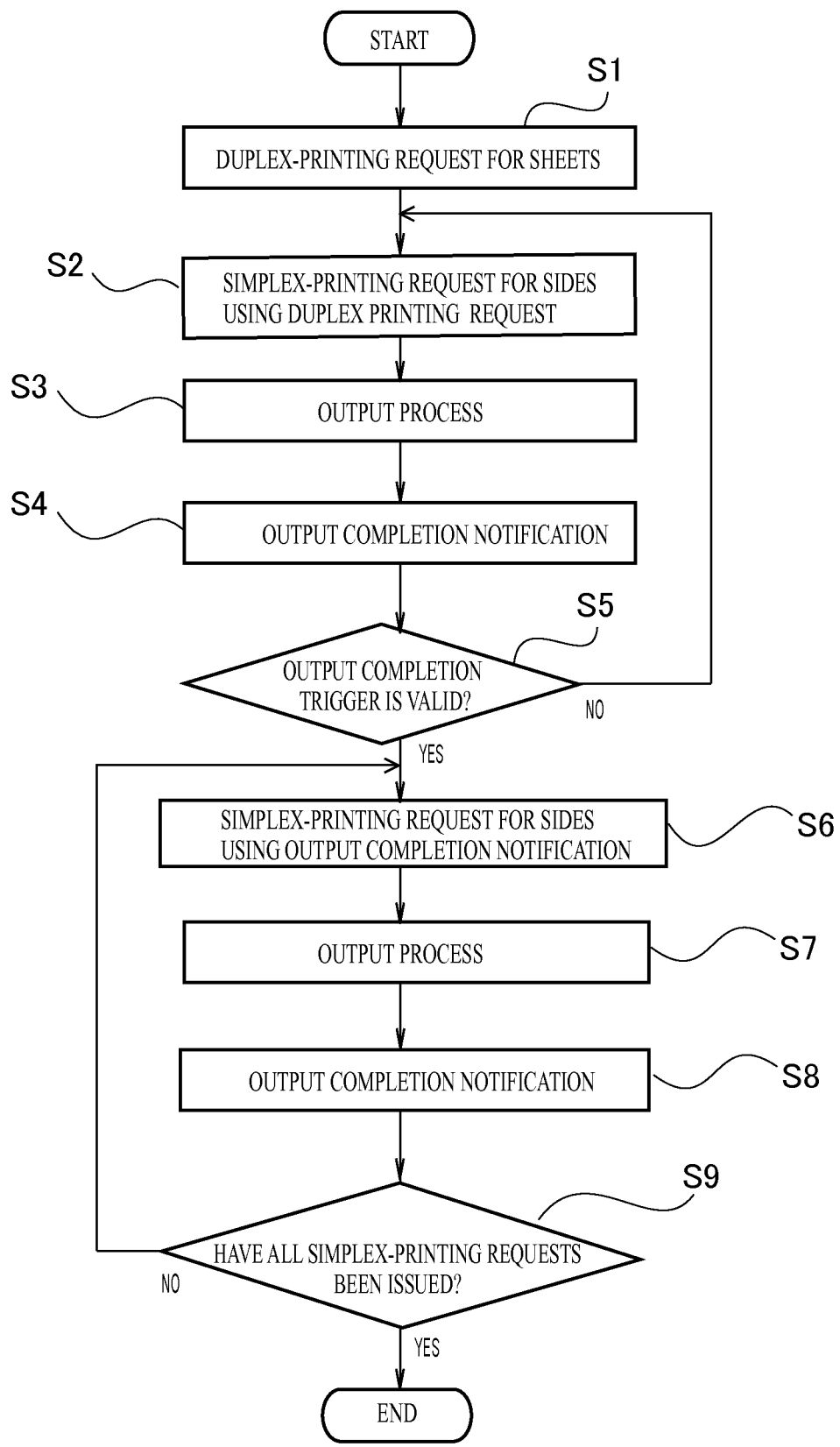
FIG. 3 shows a flowchart illustrating high-speed duplex print process of the image forming apparatus.
Figure 4:
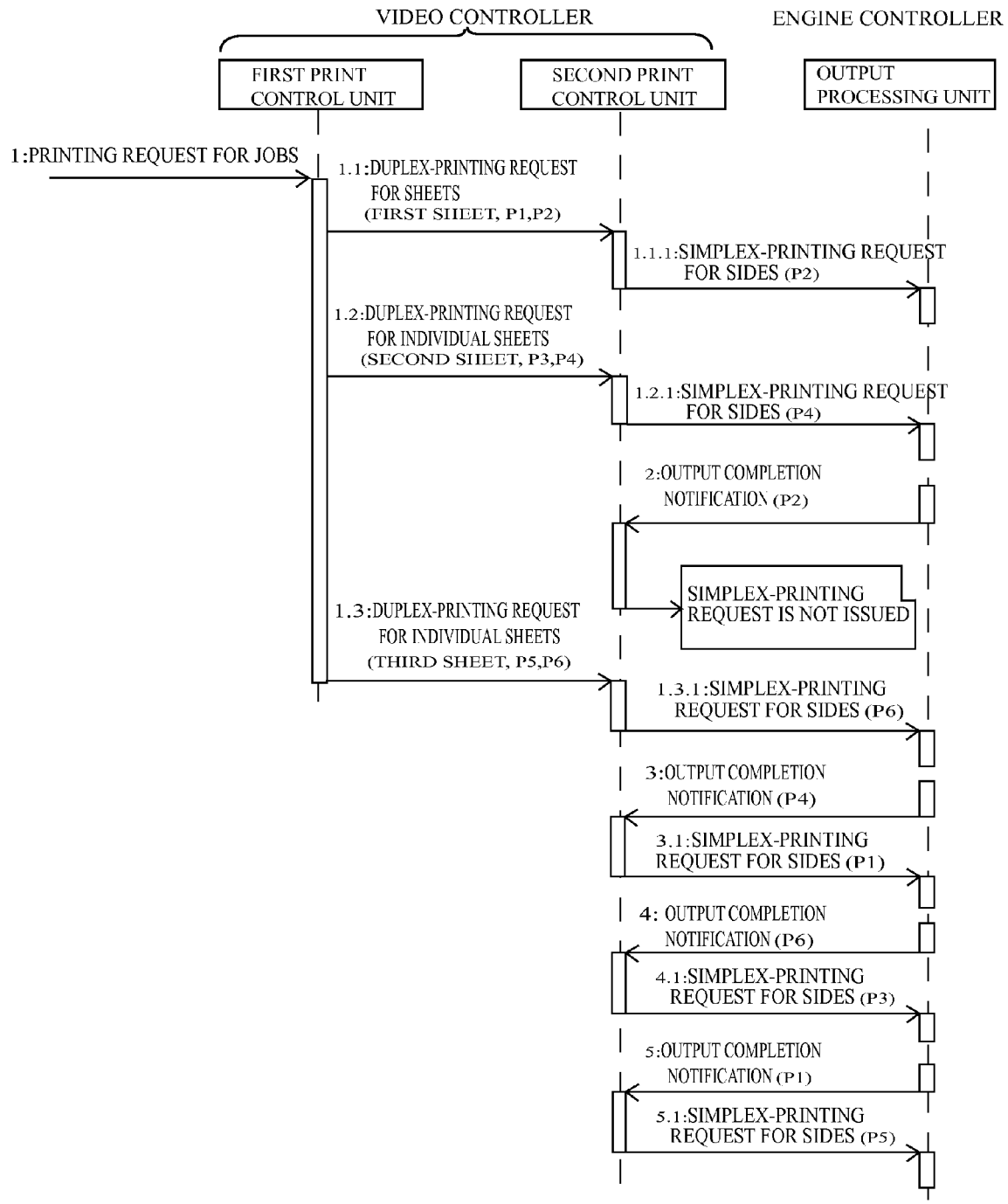
FIG. 4 shows a timing chart illustrating an example of high-speed duplex print process of the image forming apparatus.

FIG. 3 shows a flowchart illustrating a high-speed duplex print process according to the embodiment of the present disclosure. FIG. 4 is a timing chart illustrating an example of the high-speed duplex print process.

In the high-speed duplex print process according to the embodiment, the process illustrated in FIG. 3 is started upon a duplex-printing job for a plurality of sheets being received from the input-side apparatus 5. The embodiment is described using an example of duplex printing (in the image forming apparatus 1) for six pages on three sheets for four-sheet circulation.

First, in step S1, duplex-printing requests for individual sheets are issued. In this step, the first print control unit 11 of the video controller 7 sequentially issues duplex-printing requests for individual sheets based on the input duplex-printing job.

In the example illustrated in FIG. 4, duplex-printing requests for both sides P1 and P2 of the first sheet, P3 and P4 of the second sheet, and P5 and P6 of the third sheet are sequentially issued.

After step S1 has been completed in this manner, the process proceeds to step S2.

In step S2, a simplex-printing request is issued using a request for duplex printing as a trigger. That is, upon issuance of a request for duplex printing from the first print control unit 11, the print request unit 17 of the video controller 7 issues a simplex-printing request for the first side included in the duplex-printing request, using the input as a trigger.

In the example illustrated in FIG. 4, simplex-printing requests for the first sides P2, P4, and P6 are sequentially issued in response to issuance of the duplex-printing requests for the first, second, and third sheets. Note that, in the example illustrated in FIG. 4, the timing of the issuance of the simplex-printing request for P6 with respect to P4 is delayed compared to the timing of the issuance of the simplex-printing request for P4 with respect to P2. Such delay may occur in accordance with the amount of information of a duplex-printing request.

After step S2 has been completed in this manner, the process proceeds to step S3.

In step S3, the output process is performed. In the output process, the output processing unit 15 of the engine controller 9 loads the simplex-printing requests for the first sides, and image formation is sequentially performed on the plurality of sheets.

In the example illustrated in FIG. 4, in response to the simplex-printing requests for P2, P4, and P6, image formation is performed on the first sides in the order of P2, P4, and P6 starting from the leading sheet in the circulation direction.

After step S3 has been completed in this manner, the process proceeds to step S4.

In step S4, an output-completion notification is output. In this step, the output processing unit 15 of the engine controller 9 outputs an output-completion notification to the video controller 7 in response to completion of the output process for each first side. In this way, step S4 is completed, and the process proceeds to step S5.

In step S5, it is determined whether or not an output completion trigger is valid. In this step, the request invalidation unit 21 of the video controller 7 maintains a trigger for the simplex-printing request for the second side based on an output-completion notification invalidated until the number of duplex-printing requests that have been input becomes equal to the number of sheets for which sequential image formation on the first sides is allowed.

If a trigger based on an output-completion notification is invalidated (NO), the process returns to step S2, and the process is repeated. If a trigger based on an output-completion notification is not invalidated (YES), the process proceeds to step S6.

In the example illustrated in FIG. 4, a trigger based on an output-completion notification is maintained as invalid until the duplex-printing request for the third sheet, corresponding to the number of sheets for which sequential image formation on the first sides is allowed, has been input. Specifically, the duplex-printing request for the third sheet is input with delay, and thus the trigger based on the output-completion notification for the preceding page P2 is invalidated, and the process returns to step S2.

In the above-described manner, steps S2 to S5 are repeatedly performed for each duplex-printing request, and image formation is sequentially performed on the first sides, as described above regarding steps S2 to S4.

On the other hand, after the number of duplex-printing requests that have been input becomes equal to the number of sheets for which sequential image formation on the first sides is allowed, invalidation of a trigger based on an output-completion notification ends, and the process proceeds to step S6. The details of step S5 will be described below regarding trigger invalidation process.

In step S6, a simplex-printing request is issued using an output completion as a trigger. That is, the print request unit 17 of the video controller 7 issues a simplex-printing request for the second side included in a duplex-printing request, using an output-completion notification from the engine controller 9 as a trigger.

In the example illustrated in FIG. 4, simplex-printing requests for the second sides P1, P3, and P5 are sequentially issued, using output-completion notifications for P4, P6, and P1 as triggers.

Step S6 is completed in this manner, and the process proceeds to step S7.

In step S7, the output process is performed as in step S3, simplex-printing requests for the second sides are performed, and image formation is sequentially performed on the plurality of sheets.

In the example illustrated in FIG. 4, in response to the simplex-printing requests for P1, P3, and P5, image formation is performed on the second sides in the order of P1, P3, and P5 starting from the leading sheet in the circulation direction. Accordingly, the process proceeds to step S8.

In step S8, an output-completion notification is issued as in step S4, and output-completion notifications are issued in response to completion of the output process for the individual second sides. Accordingly, the process proceeds to step S9.

In step S9, it is determined whether or not all the simplex-printing requests have been issued. In this step, if there is no simplex-printing request to be issued next at the time when each output-completion notification is received, the process ends. In this case, duplex printing has been performed on all the sheets, and high-speed duplex printing is completed. On the other hand, if there is a simplex-printing request to be issued next, the process returns to step S6, and the simplex-printing request is issued using an output-completion notification as a trigger.

In the example illustrated in FIG. 4, the process returns to step S6 after output-completion notifications for P4 and P6 have been issued, and the process ends after the output-completion notification for P1 has been issued.

In the above-described manner, steps S7 to S9 are repeatedly performed every time an output-completion notification is received, and image formation is sequentially performed on the second sides, as described above regarding steps S7 to S9.

Figure 5:
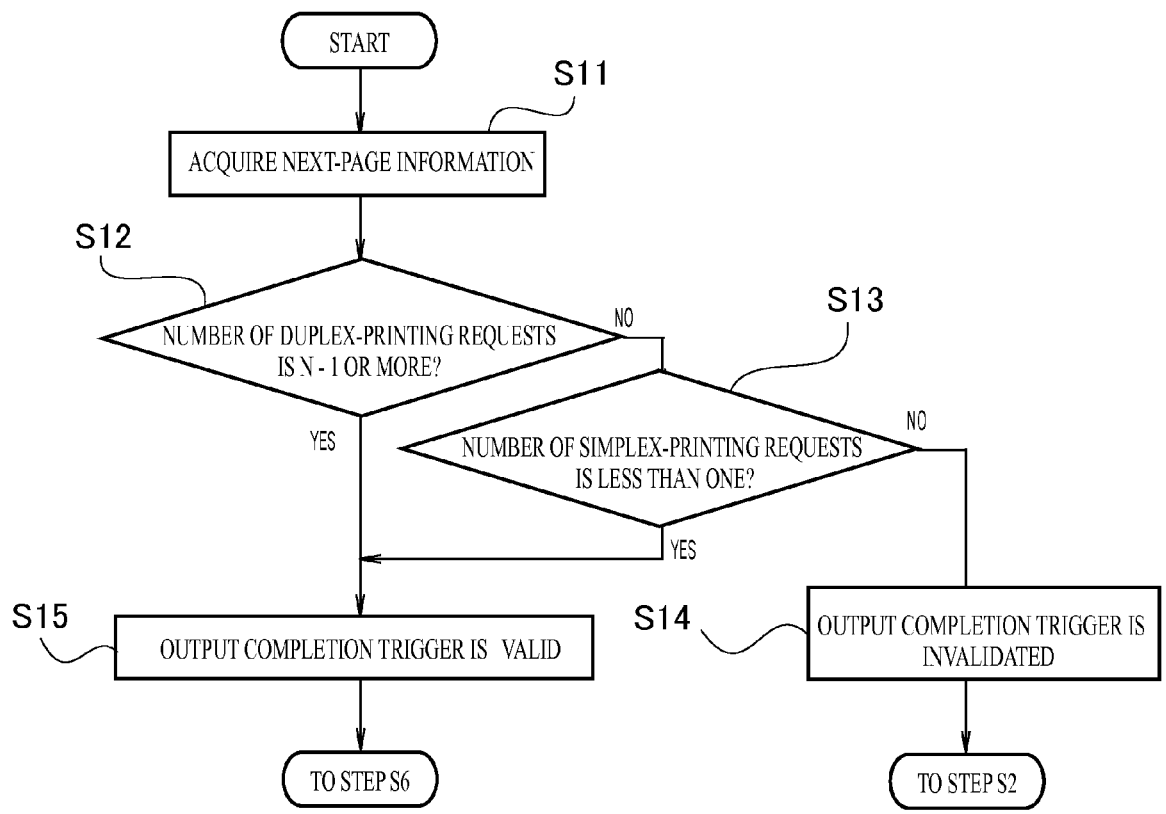
FIG. 5 shows a flowchart illustrating trigger invalidation process of the image forming apparatus.

FIG. 5 shows a flowchart illustrating a trigger invalidation process according to the embodiment of the present disclosure. The trigger invalidation process according to the embodiment is started when the video controller 7 receives an output-completion notification which is output in step S4 in FIG. 3.

First, in step S11, next-page information is acquired. In this step, upon receiving an output-completion notification, the request invalidation unit 21 acquires, from the RAM or the like, information about the side for which a simplex-printing request is to be issued next (next-page information). Accordingly, step S11 ends, and the process proceeds to step S12.

In step S12, it is determined whether or not the number of duplex-printing requests is N−1 or more. In this step, the request invalidation unit 21 determines, based on the acquired next-page information, whether or not the number of duplex-printing requests is N−1 or more. If the number of duplex-printing requests is N−1 or more (YES), the process proceeds to step S15. If the number of duplex-printing requests is less than N−1 (NO), the process proceeds to step S13.

In the example illustrated in FIG. 4, the next page is P1 when the output-completion notification for P2 is issued. Thus, it is determined that the number of duplex-printing requests is less than N−1 (NO). On the other hand, the next page is P6 when the output-completion notification for P4 is issued. Thus, it is determined that the number of duplex-printing requests has reached N−1 (YES).

In step S13, it is determined whether or not the number of simplex-printing requests for which output has not been completed is less than one. That is, the request invalidation unit 21 determines, based on the number of issued simplex-printing requests and the number of received output-completion notifications, whether or not the number of simplex-printing requests for which the output-completion notification has not been received is less than one.

If the number is less than one (YES), the process proceeds to step S15. If the number is one or more (NO), the process proceeds to step S14.

In step S14, an output completion trigger is invalidated. In this step, the request invalidation unit 21 invalidates a trigger based on an output-completion notification, so that the print request unit 17 does not issue a simplex-printing request. In this case, high-speed duplex printing returns from step S5 to step S2 in FIG. 3.

In the example illustrated in FIG. 4, at the time when the output-completion notification for P2 is issued, the number of duplex-printing requests is less than N−1 and the number of simplex-printing requests for which output has not been completed is one or more. Thus, a trigger based on an output-completion notification is invalidated, and the process returns to step S2 in FIG. 3 without a simplex print request being issued.

Invalidation of a trigger based on an output-completion notification is performed if either of the following conditions is satisfied: the number of duplex-printing requests is less than N−1, or the number of simplex-printing requests for which output has not been completed is one or more. In other words, if neither of the conditions are satisfied, a trigger based on an output-completion notification is not invalidated, and the trigger is regarded as being valid.

Figure 6:
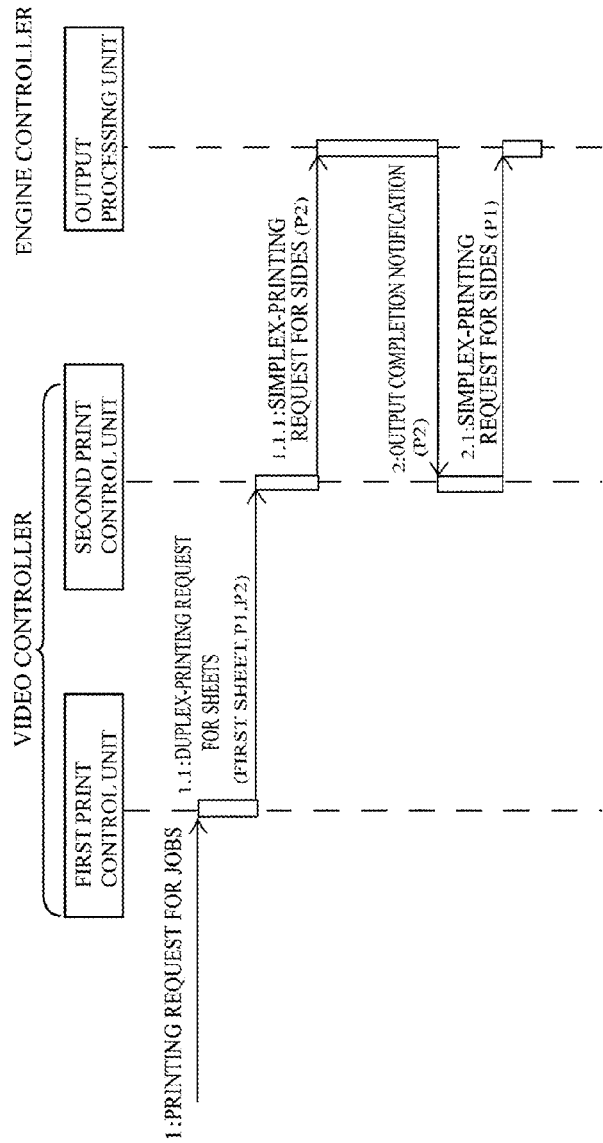
FIG. 6 shows a timing chart illustrating an example of duplex print process of the image forming apparatus.

FIG. 6 shows a timing chart illustrating an example of duplex print process in which the total number of duplex-printing requests is less than N−1.

In the example illustrated in FIG. 6, when the output-completion notification for P2 is issued, the number of simplex-printing requests for which output has not been completed is zero, which is less than one, and thus the condition "the number of simplex-printing requests for which output has not been completed is one or more" is not satisfied. In this case, the process proceeds from step S13 to step S15. That is, invalidation of a trigger based on an output-completion notification in step S14 is not performed.

In this way, the process in step S13 enables high-speed duplex printing to be completed even if the total number of duplex-printing requests of a duplex-printing job is less than N−1. In addition, the process in step S13 enables switching from the high-speed duplex-printing mode to the normal duplex-printing mode.

In the example illustrated in FIG. 6, a trigger based on the output-completion notification for P2 is not invalidated. Thus, the high-speed duplex-printing mode can be switched to the normal duplex-printing mode by issuing the simplex-printing request for P1 and printing P1 after P2.

In step S15, validation of a trigger is performed. That is, the request invalidation unit 21 completes the trigger invalidation process without invalidating a trigger based on an output-completion notification. After that, high-speed duplex printing proceeds from step S5 to step S6 in FIG. 3, and the print request unit 17 issues a simplex-printing request.

The image forming apparatus 1 according to the embodiment includes the print request unit 17, the output processing unit 15, the request control unit 19, and the request invalidation unit 21. The print request unit 17 issues simplex-printing requests for individual sides based on a plurality of input duplex-printing requests for individual sheets. The output processing unit 15 receives the simplex-printing requests for the individual sides, performs the output process, and causes image formation to be performed on corresponding sides. The request control unit 19 causes, in response to issuance of the plurality of duplex-printing requests, the print request unit 17 to sequentially issue simplex-printing requests using, as a trigger, either input of each duplex-printing request or completion of the output process for a simplex-printing request in the output processing unit 15 (output-completion notification). The request invalidation unit 21 maintains a trigger based on the completion of the output process as invalid until the number of duplex-printing requests that have been input becomes equal to the number of sheets for which sequential image formation on first sides is allowed.

Therefore, until the number of duplex-printing requests that have been input becomes equal to the number of sheets for which sequential image formation on first sides is allowed, simplex-printing requests for the first sides can be sequentially issued only by using a request for duplex printing as a trigger.

Accordingly, the image forming apparatus 1 according to the embodiment is capable of reliably executing the high-speed duplex-printing mode in which image formation is sequentially performed on the first sides of a plurality of circulating sheets starting from the leading sheet and then image formation is performed on the second side of at least the leading sheet, even if input of the duplex-printing request for the second or subsequent sheet is delayed.

The request invalidation unit 21 according to the embodiment does not invalidate a trigger based on an output-completion notification if the output process is performed on the last of the simplex-printing requests that have been sequentially issued by the print request unit 17.

Thus, even if the total number of duplex-printing requests of a duplex-printing job is less than the number of sheets for which sequential image formation on first sides is allowed, when the last of the issued simplex-printing requests is output, an output-completion notification can be used as a trigger to issue a simplex-printing request, and accordingly high-speed duplex printing can be completed.

In addition, if the total number of duplex-printing requests is one, an output-completion notification for the first side is used as a trigger to issue the simplex-printing request for the second side of the same sheet. Thus, as described above, even if a duplex-printing job is accepted as a job in the high-speed duplex-printing mode, the mode can be switched to the normal duplex-printing mode.

The high-speed duplex-printing mode can be applied to image forming apparatuses, such as various types of printers and digital multifunction peripherals.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

The invention claimed is:

1. An image forming apparatus comprising:
   a high-speed duplex-printing mode execution unit configured to execute, if duplex image formation is to be performed, a high-speed duplex-printing mode in which (i) image formation is sequentially performed on first sides of a plurality of sheets starting from a leading sheet in a circulation direction in accordance with the number of sheets capable of being simultaneously circulated and (ii) image formation is subsequently performed on a second side of at least the leading sheet;

a print request unit configured to issue simplex-printing requests for individual sides based on a plurality of input duplex-printing requests for individual sheets;

an output processing unit configured to receive the simplex-printing requests for the individual sides, perform an output process, and cause image formation to be performed on corresponding sides;

a request control unit configured to cause, in response to issuance of the plurality of duplex-printing requests, the print request unit to sequentially issue simplex-printing requests using, as a trigger, either input of each duplex-printing request or completion of the output process for a simplex-printing request in the output processing unit; and a request invalidation unit configured to maintain a trigger based on the completion of the output process as invalid until the number of duplex-printing requests that have been input becomes equal to the number of sheets for which sequential image formation on first sides is allowed.

2. The image forming apparatus according to claim 1, wherein the request invalidation unit does not invalidate the trigger based on the completion of the output process if the output process is performed on the last one of the simplex-printing requests that have been sequentially issued by the print request unit.

3. The image forming apparatus according to claim 1, wherein the image forming apparatus comprises a digital multifunction peripheral.

4. The image forming apparatus according to claim 1, wherein the print request unit is further configured to receive input duplex-printing requests from an input-side apparatus.

5. The image forming apparatus according to claim 4, wherein the input-side apparatus comprises a scanner.

6. The image forming apparatus according to claim 4, wherein the input-side apparatus comprises a processing terminal.

7. The image forming apparatus according to claim 1, wherein the image forming apparatus further comprises a central processing unit (CPU) serving as a control element, and a read only memory (ROM) and a random access memory (RAM) serving as storage devices.

8. The image forming apparatus according to claim 1, wherein the image forming apparatus is configured with a three-sheet circulation.

9. The image forming apparatus according to claim 1, wherein the image forming apparatus is configured with a four-sheet circulation.

10. The image forming apparatus according to claim 1, wherein the number of sheets capable of being simultaneously circulated changes in accordance with the size of sheets or the length of a transport path.

11. A non-transitory computer-readable recording medium having an image formation program recorded thereon, the program causing a computer to function as an image forming apparatus, the program causing the computer to function as:

a high-speed duplex-printing mode execution unit configured to execute, if duplex image formation is to be performed, a high-speed duplex-printing mode in which (i) image formation is sequentially performed on first sides of a plurality of sheets starting from a leading sheet in a circulation direction in accordance with the number of sheets capable of being simultaneously circulated and (ii) image formation is subsequently performed on a second side of at least the leading sheet;

a print request unit configured to issue simplex-printing requests for individual sides based on a plurality of input duplex-printing requests for individual sheets;

an output processing unit configured to receive the simplex-printing requests for the individual sides, perform an output process, and cause image formation to be performed on corresponding sides;

a request control unit configured to cause, in response to issuance of the plurality of duplex-printing requests, the print request unit to sequentially issue simplex-printing requests using, as a trigger, either input of each duplex-printing request or completion of the output process for a simplex-printing request in the output processing unit; and a request invalidation unit configured to maintain a trigger based on the completion of the output process invalidated until the number of duplex-printing requests that have been input becomes equal to the number of sheets for which sequential image formation on first sides is allowed.

12. The non-transitory computer-readable recording medium according to claim 11, wherein the request invalidation unit does not invalidate the trigger based on the completion of the output process if the output process is performed on the last one of the simplex-printing requests that have been sequentially issued by the print request unit.

13. The non-transitory computer-readable recording medium according to claim 11, wherein the computer comprises a digital multifunction peripheral.

14. The non-transitory computer-readable recording medium according to claim 11, wherein the print request unit is further configured to receive input duplex-printing requests from an input-side apparatus.

15. The non-transitory computer-readable recording medium according to claim 14, wherein the input-side apparatus comprises a scanner.

16. The non-transitory computer-readable recording medium according to claim 14, wherein the input-side apparatus comprises a processing terminal.

17. The non-transitory computer-readable recording medium according to claim 11, wherein computer comprises a central processing unit (CPU) serving as a control element, and a read only memory (ROM) and a random access memory (RAM) serving as storage devices.

18. The non-transitory computer-readable recording medium according to claim 11, wherein the image forming apparatus is configured with a three-sheet circulation.

19. The non-transitory computer-readable recording medium according to claim 11, wherein the image forming apparatus is configured with a four-sheet circulation.

20. The non-transitory computer-readable recording medium according to claim 11, wherein the number of sheets capable of being simultaneously circulated changes in accordance with the size of sheets or the length of a transport path.

* * * * *